Dec. 3, 1957    A. T. KOLTHOFF ET AL    2,814,878
TAILOR'S COAT AND OVERCOAT DRAFTING SLIDE RULE OR DEVICE
Filed May 18, 1955    7 Sheets-Sheet 2

Dec. 3, 1957 A. T. KOLTHOFF ET AL 2,814,878
TAILOR'S COAT AND OVERCOAT DRAFTING SLIDE RULE OR DEVICE
Filed May 18, 1955 7 Sheets-Sheet 3

INVENTORS
Aage Thorwald Kolthoff
Hubert Louis Taylor

United States Patent Office 2,814,878
Patented Dec. 3, 1957

2,814,878

TAILOR'S COAT AND OVERCOAT DRAFTING SLIDE RULE OR DEVICE

Aage T. Kolthoff and Hubert Louis Taylor,
New York, N. Y.

Application May 18, 1955, Serial No. 509,175

33 Claims. (Cl. 33—11)

This invention relates to drafting devices for use by tailors in drafting coats, overcoats and the like or patterns thereof. Drafting devices heretofore known, left a good deal to guess work as to the garment sizes and contours and could easily occasion errors in the making of a garment. In addition it took considerable time to lay out the garment elements.

An object of this invention is to provide the tailor with the outline of the most difficult parts of a garment to be drafted. Another object is to make possible the duplication of any draft without use of, or having a pattern. A still further object is to eliminate most of the errors in the making of a garment due to errors in measurement and/or calculation. It is also an object to provide a transparent instrument of replaceable and interchangeable parts.

To further show how these objectives are attained, examples for drafting various coats are given, and a detailed description is given to accompany the drawings of the drafting device. For drafting a complete garment, three drafting slide rules are used, the interdependency of which will be apparent from the description and the figures. Other objects will also be apparent from the following description.

The drafting device herein has adjustable members for enabling the drafting of a garment with essentially any dimension desired so that the garment will provide a perfect fit for the wearer. The adjustments are secured by movably mounting one member or part on another and particularly movably mounting the principal members on the base rule. Any movable mounting may be used; however, the drafting device herein preferably slidably mounts one part on another in order to secure adjustability for various dimensions and sizes.

Figure 1:
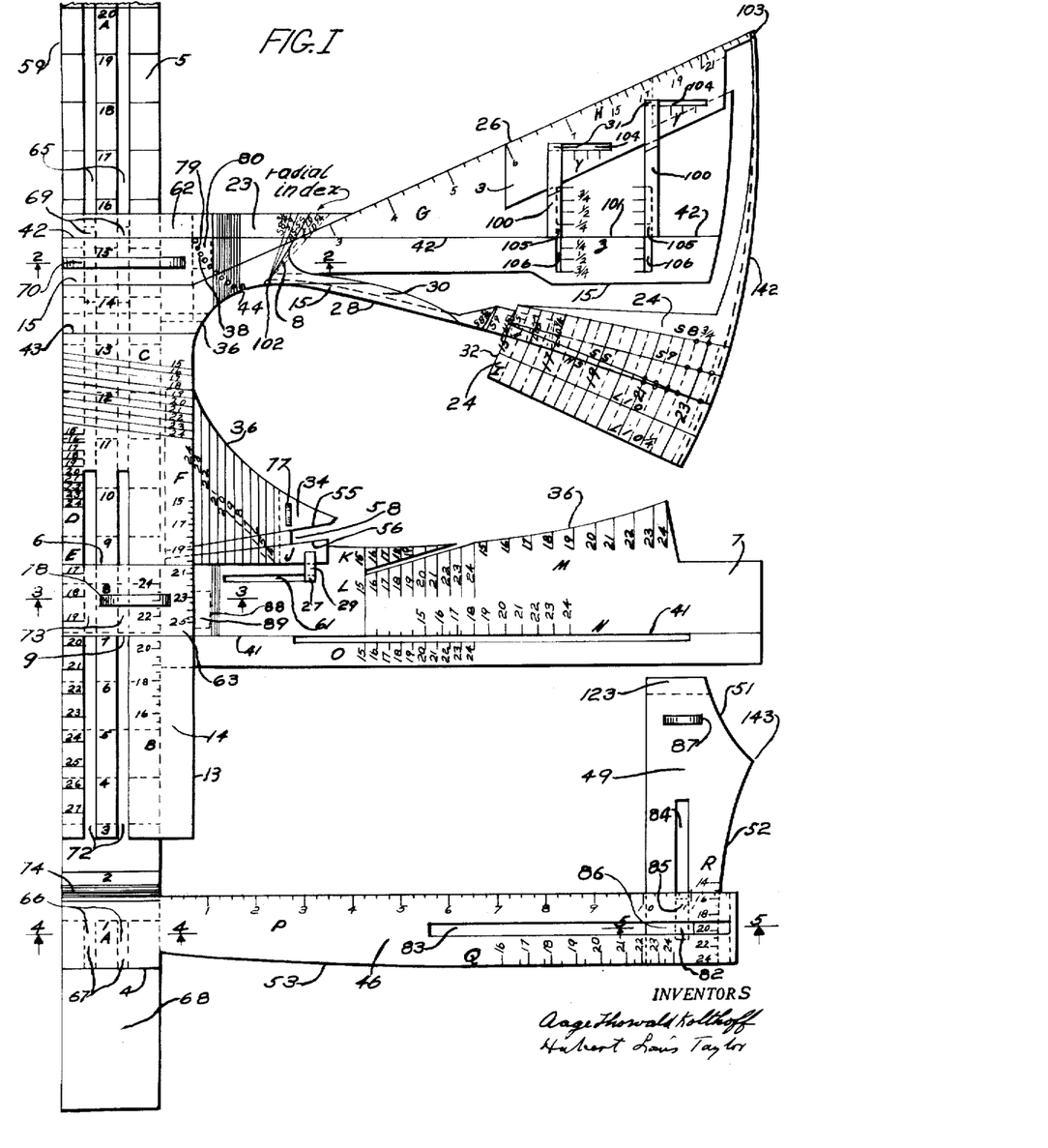
Figure 1 shows a breast rule without a breast allowance means, and with part of the basic or base rule cut away.

Referring to Fig. 1 the drafting device includes a base or breast rule 5 upon which is mounted at least one member extending laterally therefrom and each member carries a portion of a curve of a garment element. Upon the base rule 5 there is movably and adjustably mounted a breast member 14, a front shoulder section 23 which is interlocked with the breast member 14 for movement together on the base rule 5, and a back width member 7, The base rule 5 also carries a scye depth rule or member 46 which is stationary thereon. A blade armhole member 34 is adjustably mounted on the back width member 7. The movable members are preferably adjustable by slidably mounting them upon the base rule or the part carrying the same although other adjustable mounting means may be used. Each member carries a portion of a curve of a garment element and suitable scales are provided for size and other adjustment of the parts as will appear more fully hereinafter. The extension 68 may serve as a handle for the base rule and the drafting device. The parts as shown in Fig. 1 are not set for any particular size.

The mounting between the movable members which are the front shoulder section 23, the breast member or slide 14, the back width member or slide 7, and the blade armhole member or slide 34, are slidable mountings which may take several forms, and as illustrated include a pair of longitudinal grooves or slots 65 in the base rule 5. The front shoulder section 23 has a pair of slots 25 shown in Fig. 6. A pair of spaced tongues 69 also shown in Fig. 11 carried by the breast member 14 are of the same size as the slots 25 shown in Fig. 6, so that they pass through the slots 25 and engage in the grooves 65 in the base rule 5. The front shoulder section 23 is therefore anchored to or interlocked with the breast member 14 by the tongues 69 (shown also in Fig. 11) and are slidable together along the base rule 5 with the tongues 69 sliding in the grooves 65. The breast member 14 also has a pair of spaced slots 72 shown also in Fig. 11, which are in alignment with the slots or grooves 65. The back width member 7 has a pair of spaced tongues 73 which pass through the slots 72 and into the slots 65 of the base rule 5 so that the back width member 7 may be adjustably movable with respect to both the base rule 5 and the breast member 14.

Figures 5, 6, 7, 8, 9, 10, 23:
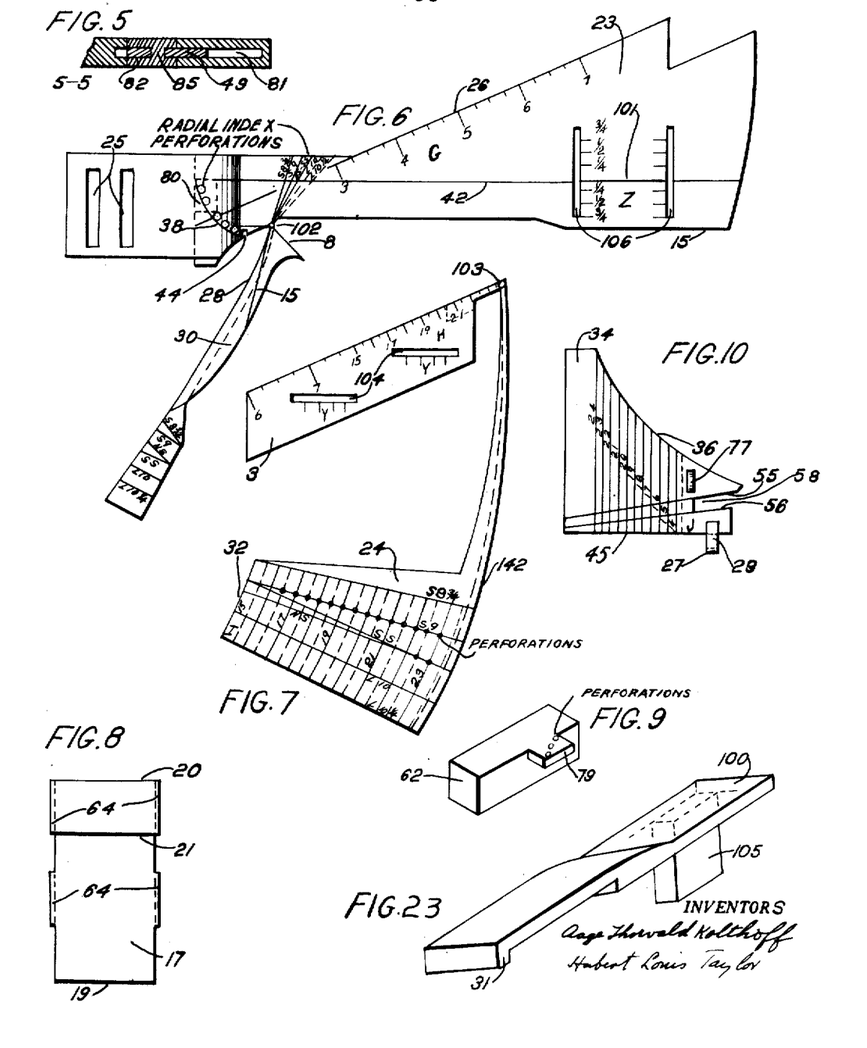
Figure 6 shows the front shoulder section without the normal neck point rider, the front shoulder run line shape lever, and the front shoulder section square shoulder adjuster.
Figure 7 shows the normal neck rider and the front shoulder run line shape lever without the rider guides for the front shoulder section.
Figure 8 shows the breast allowance member or slide.
Figure 9 shows the square shoulder adjuster for the front shoulder section.
Figure 10 shows the blade armhole member or slide.
Figure 23 is an enlarged isometric view of the rider guide.

The front shoulder section 23 preferably carries a front armhole lever 30 (shown also in Fig. 6) with its front armhole shape line or curve portion 28 corresponding with the N. S. or normal shoulder line of a front shoulder lever 24 (shown also in Fig. 7). Lever 30 swings on a hinge or pivot 102 located at or adjacent the sleeve balance line 15; and lever 24 swings on a hinge or pivot 103 located at the right end of the normal neck point rider at its upper edge, although its position is adjustable. The strap line edge 26 extends at an angle of about 23° with respect to a vertical line from the base rule 5 or with respect to the sleeve balance line 15, and intersects the same at or about at the normal breast line 16 shown in Fig. 18. Along the edge of the strap line edge 26 is a strap size scale G. A pair of spaced rider guides 100 shown also in Fig. 23, each have a runner 105 which is received in a longitudinally extending groove or slot 106 (Fig. 6 also) in the front shoulder member or section 23 and a tongue 31 (shown in Fig. 23 also) that fits in a laterally extending groove 104 (Fig. 7 also) provided in a normal neck point rider 3 shown also in Fig. 7. Concerning the interfitting of member 100 illustrated in Fig. 23, if the sheets having Figs. 1 and 23 are studied together they will reveal that there are two members 100 (Fig. 23); one fitting into the left groove 106 of member 23, Figs. 1 and 6, and into the left groove 104 of member 23, Figs. 1 and 7; the other fitting into the right groove of the above mentioned members. Projection 31 of member 100, Figs. 1 and 3, slides in groove 104 of member 3, Fig. 1 and 7. Projection 105 of member 100, Figs. 1 and 23, slides in groove 106 of member 23, Figs. 1 and 6. Since member 3 rides on member 23, member 100 must have a section undercut so that member 3 can move under it while the rest of member 100 rests or slides on member 23. A front shoulder run line or curve portion 142 (Fig. 7 also) is provided by the edge of lever 24 and this lever carries the front shoulder point size scale I having marking holes at the various size indicia. A normal zero line 101 is provided for the rider scale Z which is the normal neck point rider vertical scale. An index wormed by the edge 8 is provided on the front armhole lever 30 for a radial scale for different shoulder forms or sizes. The front shoulder lever 24 also has an indexing edge 32 shown in Fig. 7. A top sleeve front notch 44 is indented in the armhole curve to provide a locating notch. A top sleeve run shape line 38 (shown also in Fig. 6) for ¾ sleeves is provided by circular perforations therethrough for marking. A top sleeve line 42 is marked on the breast member 14 (Fig. 11 also) and on the front shoulder member 23; and an undersleeve line 43 is marked on the breast member 14. The edge 36 provides a back height shape line or curve. A breast slide handle 70 may be provided.

The breast back width member or slide 7 has a back height shape line or curve 36 providing a portion of the armhole curve and a back shoulder height size scale M along the curve gives the back height of the garment element. The edges 6 and 9 provide indexes which with the size scales E and F enable proper positioning of the member with respect to the front shoulder section 23 to give a proper size to the sleeve opening and sleeve parts. A sleeve width line 41 is a prolongation of index edge 9. Preferably along this line is a laterally extending slot with a top sleeve height scale N along one edge and an undersleeve height scale O along the other edge. A slot extending obliquely from the back height shape line 36 has an undersleeve width scale L which, however, corresponds with the back sleeve notch scale K. This slot provides a part of the back of the sleeve curve.

A blade armhole member or slide 34 shown also in Fig. 10 is slidably attached to the back width member 7 by means of a tongue 27 on a guide 29 which is received in a laterally extending slot 61. The edge 36 provides a portion of the armhole curve. The position of the member 34 and the edge 36 is adjustably movable for size towards or away from the base rule 5. The blade armhole slide size scale J thereon cooperates with the right edge of the breast member 14 as an index. 29 is an arm of the blade armhole slide and has a tongue 27 that slides in groove 61 for controlling the movement of the blade armhole slide. A blade armhole notch 58 extending at a slight angle from a vertical with respect to the base rule 5 provides a front side seam run 55 and a back side seam run 56. A handle 77 may be provided.

Figures 11, 12, 13:
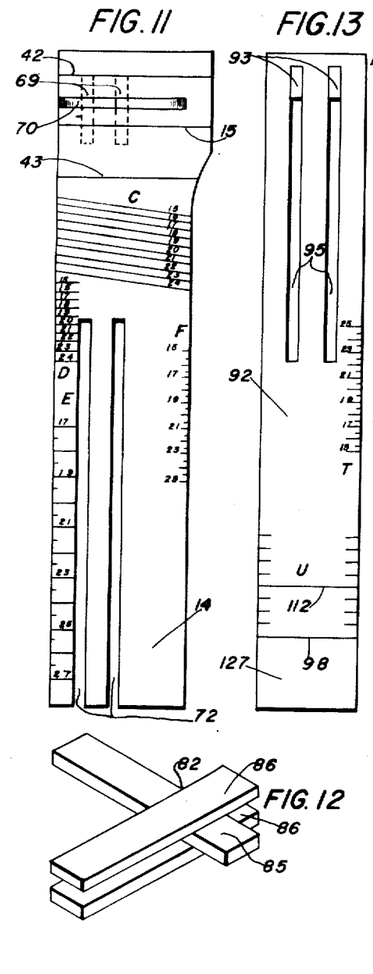
Figure 11 shows the breast member or slide.
Figure 12 is an isometric view of the double cross means for the top back slide member.
Figure 13 shows the waist base or basic rule.

The scye depth member 46 is preferably a separable part which is fixed to the base rule 5 by a pair of tongues 67 which fit snugly in slots 66 in the base rule 5. The edge 74 of member 46 is rounded downwardly to allow the end of the breast member or slide 14 to ride over the scye depth member 46. A construction line 4 is marked on the base rule 5. The scye depth scale P extends along the upper edge of member 46. The edge 53 provides the scye depth center seam run line which is a portion of the curve of a garment element. The scye depth member 46 has vertical space grooves 83 in the top and bottom wall, and carries a top back slide 49 which has a groove 84. The eccentric double cross 82 shown also in Fig. 12 is comprised of an outer section 86 which moves in groove 83 and a middle section 85 which moves in groove 84 of member 49. The eccentric double cross 82 in combination with slots 83 and 84 directs the rectilinear motion of member 49 so that it moves along member 46 from left to right and vice versa, and up and down at right angle to member 46. A shoulder back run line 51 and a top back run line 52 provide a portion of the curve of a garment element, and a back neck point 143, a handle 87 and a top back slide leg 123 complete member 49.

A space 75 (Fig. 3) between member 14 and rule 5 is provided for the movement of member 34. A horizontal space groove 81 between the top and bottom wall (Fig. 5) is provided for movement of the top back slide 49 and part 85 of the double cross 82.

Referring to Fig. 8 a breast allowance member or slide 17 is adjustably mounted on the upper end of the base rule 5 (Fig 1) preferably by sliding the same thereon; the shoulders 64 engaging the edges of the base rule 5. The lower edge 19 cooperates with divisions of the basic rule inch scale A (Fig. 1) and index 21 establishes the front balance line at the breast of a single breast coat, and the upper edge 20 of member 17 establishes the front balance line at the breast for a double breast coat.

A waist rule 92 (Fig. 13) cooperates with the breast base rule 5 to give drafting information and guidance at the waist of a garment. The waist rule 92 has a construction index 98, and an index 112 is the normal center seam run line and the zero line of the waist center seam run line plus and minus scale U. Slots or grooves 95 extend longitudinally and receive lugs or tongues 94 (Fig. 14) which adjustably mount a waist front width member or slide 90 (Fig. 14) upon the waist rule 92. Lugs 93 (Fig. 13) engage in slots 91 (Fig. 14) to aid in adjustably mounting the waist front width member 90 upon the waist rule 92. The lower edge 126 of slide 90 being the double breast line index (Fig. 14) provides an index which cooperates with the draft sleeve balance line 2 (Fig. 20) for drafting a double breasted coat. The sleeve balance line index 146 (Figs. 14 and 19) is adjusted until it aligns with the draft sleeve balance line 2 (Fig. 19) when a single breast coat is being drafted. The position of the slide 90 is determined, therefore, by the front shoulder section 23 carried by the breast slide 14 (Fig. 1). A leg 138 (Fig. 14) may be provided at the end.

Figures 14, 15, 17:
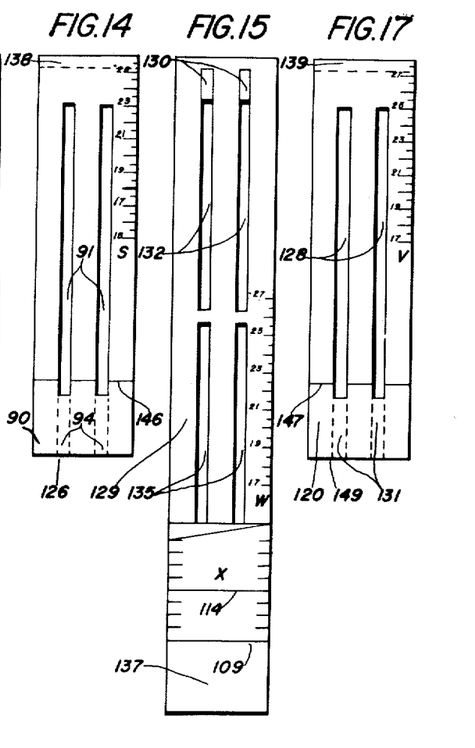
Figure 14 shows the waist front width member or slide.
Figure 15 shows the seat base or basic rule.
Figure 17 shows the seat front width member or slide.
Figure 16:
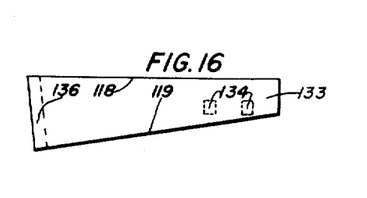
Figure 16 shows the skirt member or slide.

A seat rule 129 (Fig. 15) cooperates with the breast or base rule 5 and with the waist rule 92 to complete the drafting of a garment. The seat rule 129 has a construction line index 109 and a normal center seam run line 114 which is the zero line for the seat center seam run line plus and minus scale X. Short grooves 135 (Fig. 15) receive tongues 134 (Fig. 16) of the skirt member or slide 133 (Fig. 16). Longer grooves 132 receive lugs or tongues 131 of a front seat width member or slide 120 (Fig. 17) which may have slots 128 which receive lugs 130 (Fig. 15) to aid in slidably mounting the front seat width member or slide 120 on the seat rule 129 (Fig. 15). In Fig. 16, an edge 119 upon the skirt slide 133 provides a front side seam run line or a portion of the curve or contour of a garment element. An edge 118 (Fig. 16) matches or cooperates with the divisions of the seat back width scale W on the seat rule 129. This edge 118 also represents the back side seam run line. A leg 136 (Fig. 16) may be provided at the end. The seat front width member or slide 120 (Fig. 17) has a lower edge 149 which is an index adjusted into alignment with the draft sleeve balance line 2 (Fig. 20) when a double breasted coat is being drafted; and an index 147 (Fig. 17) is brought into alignment with the draft sleeve balance line 2 (Fig. 19) when a single breast coat is being drafted. The position of index line 147 and of index edge 149 is determined therefore from the position of the front shoulder member 23 carried by the breast member or slide 14. Preferably the seat front width member 120 is adjustably mounted upon the seat rule 129 by sliding thereon, which mounting includes the tongues 131 which are received in grooves 132 (Fig. 15). A leg 139 may be provided (Fig. 17).

The drafting device preferably is provided with means for adjusting the same for a square shouldered (SS) garment. Part of the means for securing this result is the pair of slots 65 (Fig. 1) which are spaced apart the distance of a square shoulder adjustment. The tongues means 69 in the breast slide 14 (Fig. 11) and the tongue means 73 on the back width member 7 (Fig. 1) are received in either of the slots 65 of the base rule 5 (Fig. 1) and hence are also a part of the means used to secure square shoulder adjustment. Also in Fig. 1, fitting between the base rule 5 and the front shoulder member 23, there may be provided a square shoulder adjuster 62 (Figs. 1 and 9) held in place by a tongue 79 fitting in a socket 80 carried by section 23. A similar square shoulder adjuster 63 (Fig. 1) is held between the base rule 5 and the breast back width member 7 by a tongue 88 fitting in a socket 89. If members 23, 7, and 14 are removed from the base rule 5, then the square shoulder adjusters 62 and 63 can be removed, and parts 23, 7, and 14 can be shifted to the left on the base rule 5 by placing the right tongue of the breast slide tongues 69 and of the breast back width slide tongues 73 in the left long groove 65 of the breast base rule 5. All the left tongues will then abut or engage the left edge 59 of the base rule 5 (Fig. 1). So adjusted, the drafting device functions in the same manner; however, the three members and all the lateral scales have been shifted to the left with respect to the base rule 5 by the width of the adjusters or the spacing of the grooves 65, for the design of a normal shoulder garment.

Figure 24:
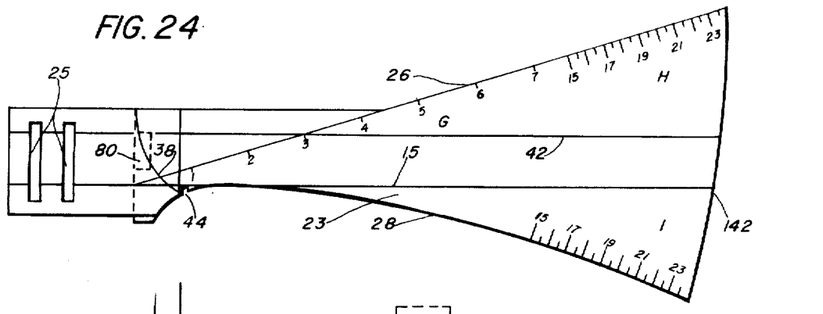
Figure 24 is a view of a similar form of the front shoulder section.

A simpler form of the front shoulder member or section 23 is illustrated in Fig. 24 which form is adequate for a normal garment but lacks the special features of the corresponding member in Fig. 1. Similar parts are similarly numbered and it is deemed that further description is unnecessary. It is used in the same manner that the front shoulder section 23 of Fig. 1 is used except as to the refinements given by the additional adjustable parts, for designs other than normal.

Figure 18:
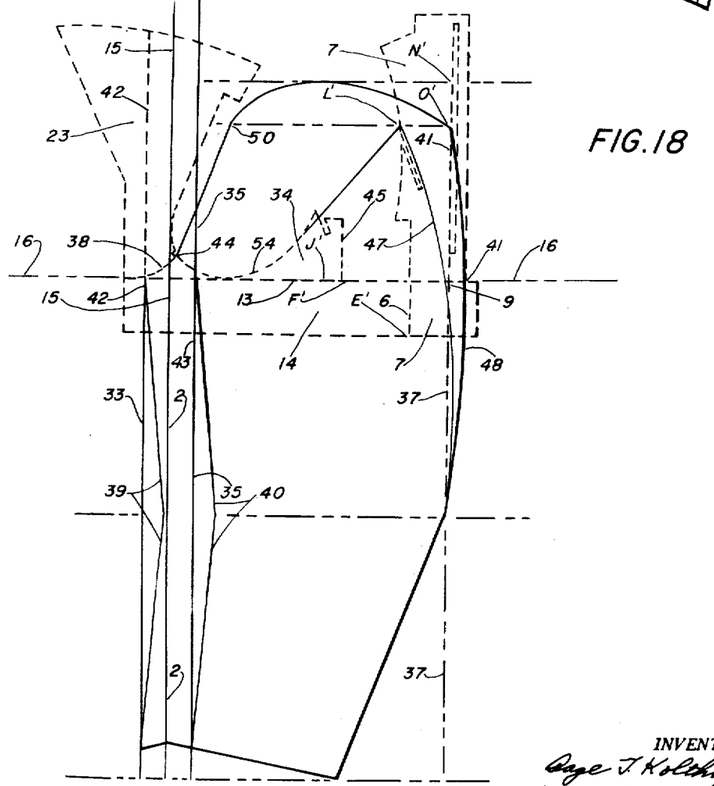
Figure 18 illustrates the drafting of a normal sleeve including the top sleeve and undersleeve.

A sleeve is made up of two sleeve elements. In drafting a normal sleeve of size 48, as shown in Fig. 18, all scale numerals of sizes are half of the size. For a size 48 then, a scale reading of 24 is used. The drafting of each sleeve element will be described simultaneously since some of the steps are similar but using different scales. For drafting a sleeve only members 14, 23, 7, and 34 are assembled and used as a unit. Refering to Fig. 18 the breast member or slide 14, the front shoulder member or section 23, the blade armhole member or slide 34, and the breast back width slide 7 are shown in position on the breast line 16 which is drawn in a position for the most economical use of the material. In this grouping the blade armhole member or slide 34 is not joined to the breast back width slide 7 by the guide 29 shown in Figs. 1 and 10, therefore, here slide 34 can move independently of slide 7. The instrument is shown by the dash lines, and the outline and interior parts of the sleeve is made up of solid lines and the the dash line of that part of the contour of the instrument that provides the remainder of the outline of the sleeve. The sleeve balance line 15 is projected on the draft as line 2. A mark is made at the top sleeve front notch 44, then slide 34 is moved or adjusted along slide 14 until its edge 45 corresponds with line 24 of the breast slide armhole scale F shown as F'. Slide 34 is then moved outward from slide 14 until line 24 of scale J corresponds with the right edge 13 of slide 14 at J'. A tracing or line is made from 44 to the end of the curved section 54 of slide 34. Slide 7 is moved along slide 14 until the edge 6 corresponds with the line 24 of the sleeve width scale E at E'. A mark is made at line 24 of the undersleeve height scale O shown as O'; a mark is made at line 24 of the top sleeve height scale N shown as N'; a mark is made at line 24 of the undersleeve width scale L shown as L'. The undersleeve line 43, the top sleeve line 42, and the sleeve width line 41 are projected on the draft as lines 35, 33 and 37 respectively. Through the perforations in the front shoulder section 23, the top sleeve run shape line for ¾ sleeve, 38 is marked. Point 50 is established the same distance from line 15 as L' is from line 41 through point O'. The inside seam of the top sleeve is drafted as 39; the inside seam of the undersleeve is drafted as 40; the outside seam of the undersleeve is drafted as 47; and the outside seam of the top sleeve is drafted as 48. Fabric cut from the two patterns made or sleeve elements drafted on the fabric will form a sleeve of size 48.

Figure 19:
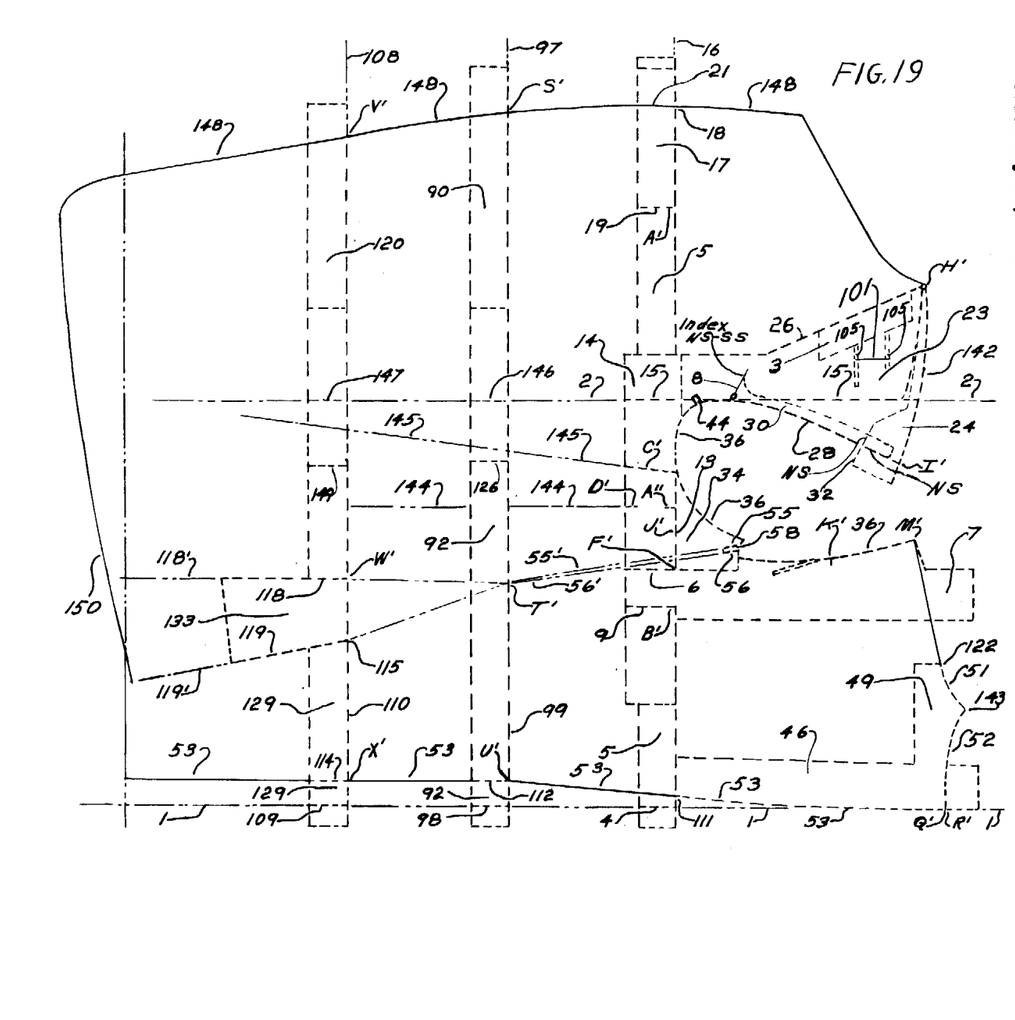
Figure 19 illustrates the drafting of a single breast normal shoulder standard size 48 coat.

The drafting device is shown in Fig. 19 for drafting the front and back elements of a coat, overcoat, and the like for a normal shoulder design. However, the following members namely the front shoulder section 23, the breast slide 14, the blade armhole slide 34, and the breast back width slide 7 have been shifted ½" to the left on the breast or base rule 5 because the square shoulder adjusters 62 and 63 have been removed and the members shifted to this position, so that a normal shoulder design may be drafted. These adjusters are inserted when a square shoulder is desired. The drafting device is shown by the dash lines. The outline of the coat is made up of a solid line and the dash line of that part of the contour of the device that provides the remainder of the outline of the coat elements.

By means of the base rule 5, the construction line 1 is first drawn and then the breast line 16, a waist line 97, and a seat line 108 are drawn at right angle to the construction line, and properly spaced with respect to each other, depending upon whether the garment is short, regular or a long one. The base rule 5 can now be placed in position with its mountings and with its right edge on line 16, and its construction line index 4 on the construction line 1.

To illustrate how the drafting device is used, a coat standard size 48 breast, 43" waist, 49" seat and length 33" will be drafted. First, the top back slide or member 49 is moved until line 24 on both scales Q the scye depth proportion scale and R the top back width proportion scale intersect at edge 53 to establish Q'R' the back center point. Member or slide 7 is now moved on rule 5 until its lower edge 9 corresponds or is aligned with line 24 of the basic rule back width scale B at B'. Breast member or slide 14 is next moved or adjusted on rule 5, until line 24 of the breast slide armhole scale F corresponds with the upper edge 6 of slide 7 at F'. This fixes the position of the front shoulder section or member 23 also. The blade armhole member or slide 34 is then moved laterally until line 24 of the blade armhole slide scale J corresponds with edge 13 of slide 14 at J'. The breast allowance member or slide 17 is moved on rule 5 until its lower edge 19 corresponds or is aligned with line 24 of scale A at A'. The movement or adjustment of members or slides 7 and 14 brings the breast member or slide 14 into the position from which the position of the sleeve balance line 2, the V suppression line 145, and the midway line 144 can be established by prolonging on the draft the sleeve balance index line 15, line 24 of the underarm seam locating scale C shown as C' and line 24 of the midway line scale D shown as D'. As a check on the accuracy of manipulation, the tailor can look across at scale A of base rule 5 and find that the midway line reading is on line 12 of scale A shown as A" which is, as it should be, ¼ of the coat size 48. Now, to establish the breast front balance point 18, a mark is made at the intersection of the single breast index line 21 of the breast allowance slide 17 and the breast line 16.

The normal neck point rider 3 is moved until the lower edge of runners 105 match the zero (normal) line 101 of the normal neck point rider's vertical scale Z, then a mark at line 24 of scale H locates the normal neck point H'. The front armhole shape line lever 30 is rotated until its index edge 8 matches the radial index line NS—SS, then the front shoulder run line lever 24 is moved until its line marked NS (normal shoulder) is continuous with line or edge 28, then a mark at line 24 of scale I locates the front shoulder point I'. A mark at 24 of scale M locates the back shoulder height point M'. Now when a tracing is made along the edge 142 of the drafting instrument between H' and I' the front shoulder run line 142 is established. For sizes smaller than 48 the tracing of line or edge 142 is accomplished by removing the front shoulder section 23 from the rest of the instrument and while having its parts in the same relative positions as before it was moved, its edge 142 is placed between the points located on H and I scales, then the tracing is made. Tracing between I' and the top sleeve front notch 44, in which the edge 28 may be used, establishes the front armhole shape line 28. Tracing between 44 and M' using the edge 36 establishes the back height shape line 36. Tracing between the shoulder back run line at point 122 and the back neck point 143 using the edge 51 of the top back slide 49, establishes the shoulder back run line 51. Tracing between point 143 and Q'R' establishes the top back run line 52; and tracing between Q'R' and point 111 using edge 53 establishes the curved part of the center seam run line 53. The solid line is now drawn connecting M' and 122 to complete that part of the coat outline provided by the correspondingly shaped parts of the drafting instrument. The blade armhole notch 58 has as its upper edge a front side seam run line section 55 and at lower edge a back side seam run line section 56 which are indexes that are prolonged on the draft as 55' and 56'. A mark at line 24 on scale K locates the back sleeve notch K'.

After drawing lines 2, 144 and 145 by projection of 15, D' and C' the waist rule 92 and the seat rule 129 are placed in position with their mountings and with their right edge on line 97 and 108 and index 98 and 109 on the construction line 1. A mark put at the intersection of the normal center seam run line index 112 (which is the zero line of scale U), and the rule's right edge 99, locates U' a point on the center seam run line, then a mark put at line 21½ (which is half the waist measurement 43) of the waist back width scale T locates the waist back width point at T'. The waist front slide 90 is moved on rule 92 until its sleeve balance line index 146 corresponds with line 2, then a mark put at line 21½ of the waist front width scale S locates the waist front balance point S'. Now the waist rule and the breast rule should be removed from the draft and lines 55' and 56' should be drawn to intersect at T'.

For a seat measurement of 49, slide 133 is moved on rule 129 until its edge or index 118 corresponds with line 24½ on the seat back width scale W to locate the seat back width point W'. Point 115 is the intersection of the other edge or index 119 and the right edge 110 of rule 129. Points W' and 115 are connected to T'.

Lines 118' and 119' are prolongations respectively of edges 118 and 119 which are the seat back side seam run line and the seat front side seam run line. Next, slide 120 is moved on rule 129 until its sleeve balance line index 147 corresponds with line 2, then a mark at line 24½ on the seat front width scale V locates the seat front balance point V'. A mark at the intersection of the normal center seam run line index 114 of scale X and edge 110 locates point X'. Now the seat rule may be removed. Point 111 is connected to U', U' is connected to X' and the line formed is prolonged to the full length of the coat. The entire outline of the front balance line 148 is completed by so placing one or more of any number of special shapers, that the edge of the shaper falls on 18, S', and V' then tracing the solid line along the edge. A special shaper may be and preferably is used for giving the curved shape to the bottom 150 of the coat.

Figure 20:
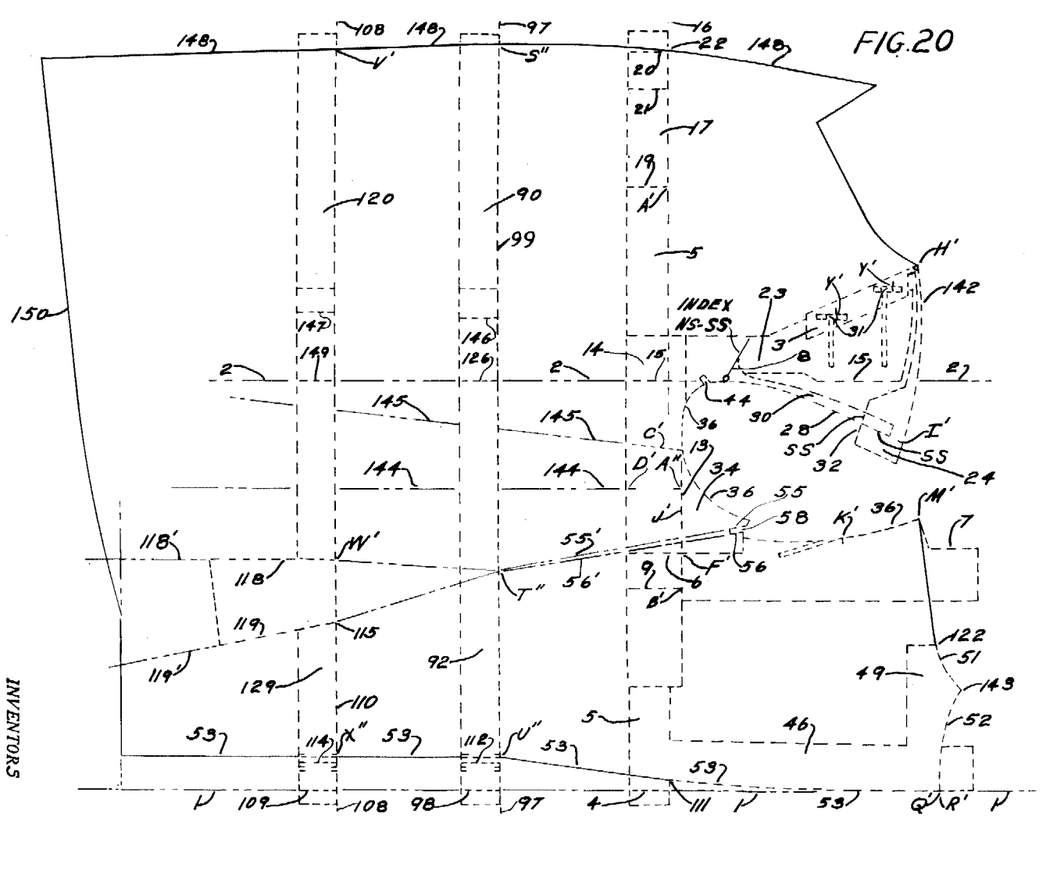
Figure 20 illustrates the drafting of a square shoulder, double breasted size 48 coat with subnormal waist 41" instead of the normal 43"

In Fig. 20 a double breasted square shoulder coat is illustrated having breast 48, waist 41, and seat 49 dimensions. To draft this garment the drafting instrument is shown in position with the front shoulder section 23, the breast slide 14, the blade armhole slide 34 and the breast back width slide 7 shifted by ½" to the right on the breast rule 5 by the insertion of the square shoulder adjusters, so that now the left edge of the breast rule 5 is one straight line. The effect of this is to raise the armhole and the scales for points H', I' and M' by ½" from the breast line 16 as compared to a normal shoulder. With the parts so positioned, a square shoulder design is drafted. Again the instrument is shown by the dash lines; and the outline of the coat is made up of a solid line and the dash line of that part of the contour of the instrument that provides the remainder of the outline of the coat. The first point to be located is Q'R', the back center point, which is located as explained in Fig. 19. Points 44, K', M', 122, 143, 111, B', F', J', A", A', 115, W', and lines 1, 2, C', 145, 13, 28, 36, 55, 55', 56, 56', D', 144, 51, 52, 53, 16, 97, 108, 118, 118', 119, 119', 148, 150, are also located as explained with respect to Fig. 19.

Next, the normal neck point rider 3, is moved to the left until the right edge of tongues 31 match with the ½" mark on the normal neck point rider horizontal scale Y shown as Y', then a mark at line 24 on scale H locates the normal neck point H'. This lowers scale H by an amount the same as it was raised by the square shoulder adjuster. The front armhole shape line lever 30 is rotated until its index edge 8 matches the radial index line NS—SS. The front shoulder run line lever 24 is moved until its line marked SS (square shoulder) is continuous with line 28, the a mark at line 24 on scale I locates the front shoulder point I'. Now lines 142 and 28 may be transferred to the draft by tracing between H' and I', and I' and 44. For sizes smaller than 48 the tracing of line 142 is accomplished by removing the front shoulder section 23 from the rest of the instrument and while having its parts in the same relative positions as before it removed, its edge 142 is placed between the points located on the H and I scales, then the tracing is made. For a proper location of the front balance line for a double breasted coat, slide 17 is moved until its lower edge 19 corresponds with line 24 of scale A shown as A', then a mark at the intersection of the double breast line or index (upper edge) 20 of slide 17 and line locates the double breast front balance point 22. Since the waist measurement is subnormal 41", instead of 43", the center seam run line will not be located along the normal center seam run lines 112 and 114 but through (−1) line of scales U and X. A mark at the intersection of (−1) line of U scale and 99 locates U", a point on the center seam run line, and a mark at the intersection of (−1) line of scale X and 110 locates X". A mark at line 20½ on scale T locates the waist back width point at T". Slides 90 and 120 are moved along their respective rules 92 and 129 until the lower edges 126 and 149, which are the double breast point matching lines, correspond with line 2, then a mark at 20½ on scale S locates the waist front balance point S″ and a mark at 24½ on scale V locates the seat front balance V′.

Figure 21:
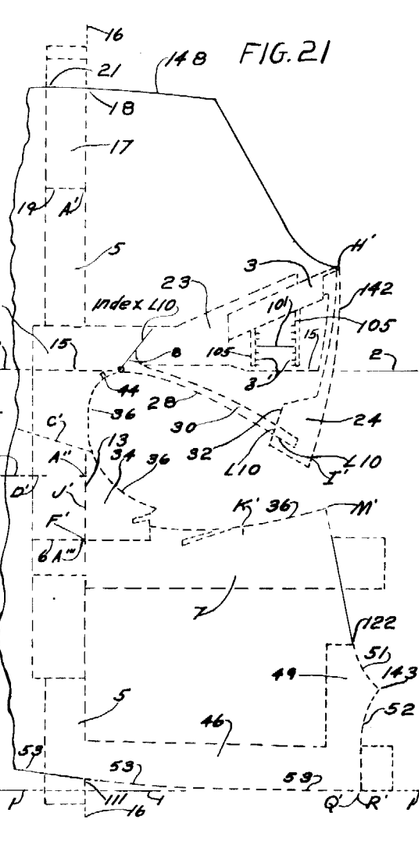
Figure 21 is a partial view of a single breast abnormal coat of size 48, and illustrates the method of establishing the position of the sleeve balance line for a coat of abnormal breast back width measurement.

In Fig. 21 the breast slide rule of the drafting device is shown in position on the draft for drafting a coat size 48 with normal shoulders and abnormal breast back width measurements of 10″. The remainder of the coat is not shown because it is normal in design and has been presented in Fig. 19. The instrument is shown by the dash lines, and the outline of the coat is made up of a solid line and the dash line of that part of the contour of the members of the instrument that provides the remainder of the coat outline. The method of locating rule 5, lines 1, 2, 16, 19, 21, 53, 51, 52, 144, 145′ D′, C′, 36, 148, and points Q′R′, 111, 143, 122, A″, A′, 18, J′, 44, M′, K′ is the same as described with respect to Fig. 19. Slide 7 is moved along the base rule 5 until its upper edge 6 corresponds with line 10 of scale A shown as A‴, then slide 14 is moved along rule 5, until line 24 of scale F corresponds with index edge 6 and A‴. The normal neck point rider 3 is moved down until the lower edge of runners 105 match the ½″ mark below the zero line (normal line) 101 of the normal neck point rider vertical scale Z shown as Z′, then a mark at line 24 of scale H locates the normal neck point H′. Lever 30 is rotated until its index edge 8 matches the index line L10. Lever 24 is rotated until its line marked L10 is continuous with edge 28. When this condition obtains, line L10 on lever 30 will be on line with the left edge 32 of lever 24. A mark at line 24 of scale I locates the front shoulder point I′. Now lines 142 and 28 may be transferred as explained with respect to Fig. 20.

Figure 22:
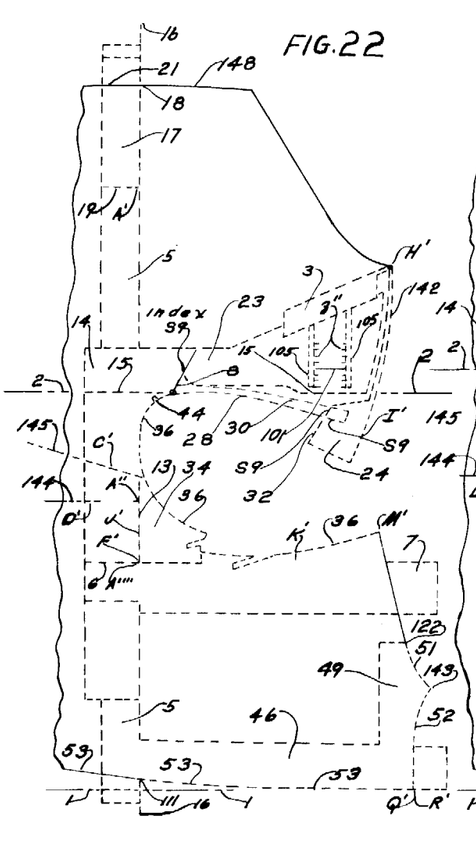
Figure 22 is a partial view of a single breast subnormal coat of size 48, and illustrates the method of establishing the position of the sleeve balance line for a coat of subnormal breast back width measurement.

Referring to Fig. 22, the breast slide rule is shown in position on the draft for drafting a coat size 48 with normal shoulders and subnormal breast back width measurement of 9″. The remainder of the coat is not shown because it is normal in design and has been presented with respect to Fig. 19. The instrument is shown by the dash lines and the outline of the coat is made up of a solid line and the dash line of that part of the contour of the instrument that provides the remainder of the coat outline. The method of locating rule 5, lines 1, 2, 16, 19, 21, 53, 51, 52, 144, 145, D′, C′, 36, 148, and points Q′R′, 111, 143, 122, A″, A′, 18, J′, 44, M′, K′, has been explained in connection with Fig. 19. Slide or member 7 is moved along rule 5 until its upper edge 6 corresponds with line 9 of scale A shown as A″″, then slide or member 14 is moved along rule 5 until line 24 of scale F corresponds with line 6 and A″″. The normal neck point rider 3 is moved up until the lower edge of runners 105 match the ½″ mark above the zero (normal) line 101, on the normal neck point rider vertical scale Z, shown as Z″, then a mark at line 24 of scale H locates the normal neck point H′. Lever 30 is rotated until its index edge 8 matches the index line S9. Lever 24 is rotated until its line marked S9 is continuous with edge 28. When this condition obtains, line S9 on lever 30 will be on line with the left edge 32 of lever 24. A mark at line 24 of scale I locates the front shoulder point I′. Now lines 142 and 28 may be transferred to the draft by tracing between H′ and I′ and between notch 44 and I′.

This application is a continuation-in-part of our application S. N. 232,176, filed June 18, 1951.

The invention is presented to fill a need for improvements in a tailor's coat and overcoat drafting slide rule. It is understood that various modifications in structure, as well as changes in mode of operation, assembly and manner of use, may and often do occur to those skilled in the art, especially after benefiting from the teachings of the invention. Hence it will be understood that this disclosure is illustrative of preferred means of embodying the invention in useful form by explaining the construction, operation, and advantages thereof.

Referring to Fig. 6, the radial index on the front shoulder member 23 has as its radius point, the point where the sleeve balance line 15 is tangent to the front armhole shape curve line 28; this point being also the pivot point 102 of the front armhole shape line lever 30. The index lines of the radial index indicate increase in measurement in a clockwise direction, i. e. from left to right the first solid index line marked S8¾ is for positioning the lever 30 for a coat of subnormal breast line back width measurement which is a smaller measurement than for a normally proportioned person; the next solid index line to the right marked S9 is for a range of subnormal measurements closer to normal. The next solid index line to the right marked NS—SS is for normal back width, normal shoulder and square shoulder measurements. The next index line is a dash broken line marked L10 is for a range of abnormal breast line back width measurements. The next dash index line to the right marked L10¼ is for a range of abnormal back width measure still greater than the range of L10. The range on the larger side is graphically indicated by a different type of index line to reduce the possible error of the tailor setting along the lines of the large range when he wants to design in the small or subnormal range. At the free end of lever 30 are inscribed curved index lines bearing the same designations in the same order as the index lines of the radial index. The curved index lines of lever 30 are arcs of the front shoulder run line curve 142 of the front shoulder run line shape lever 24 shown in Fig. 7. These lines are to be matched or made coincident with the edge 32 of lever 24 of Fig. 7, at the same time that the front armhole shape curve 28 is matched or made coincident with an index line of lever 24 of Fig. 7. This double matching by two sets of matched lines insures the correct positioning of lever 24 of Fig. 7 with respect to the position of lever 23 whose position is determined by its index edge 8 with an index line of the radial index of member 23. Member 23 is cut away at its right upper end to allow room for lever 24 to move in as the rider 3 is moved to different positions.

Referring to Fig. 7, the normal neck point rider 3 is a thin section that rests on the upper narrow end of the front shoulder run line shape lever 24 where they are pivoted together at 103. The rider 3 slides on 23 Fig. 6 while its movement is controlled and limited by the slots 106 of 23 of Fig. 6, the grooves 104 of 3 and the pair of rider guides 100 of 23. The lever 24 widens from its pivoted end towards its free end where it expands to the left of the front shoulder run line 142 into a frustum-like shaped portion. On the expanded portion is the front shoulder point scale I which has index lines running lengthwise of the portion and at right angle to the indicia lines of scale I. The index lines are labeled as follows: S8¾ is for subnormal breast line back width measurement range; S9; NS; SS; L10; L10¼. All these are for the same ranges of measurements as explained for these labels as shown on the radial index. The indicia lines of the front shoulder point scale I and the left edge 32 of the expanded portion are concentric arcs of the curve 142. The indicia lines are marked as alternate solid and dash broken lines crossing the lengthwise index lines. At each intersection of an index line and an indicia line there is a perforation or small hole through which a mark can be made.

We claim:

1. A drafting device for a coat, overcoat and the like comprising a base rule having an edge providing a breastline reference, a construction line reference index on the base rule, at least one size scale on the base rule; and means carried by the base rule providing an armhole curve adjustable for size and locating including a front shoulder member movably mounted upon the base rule and having a portion of a front armhole curve having a top sleeve front notch, a sleeve balance line on said member extending a right angles to the base rule, a forwardly inclined strap line edge on said member extending at an angle of approximately 23° with respect to the sleeve balance line and intersecting the breast-line at the sleeve balance line, when the member is positioned on the base rule for drawing normal coats a strap line scale along the strap line edge, and a front shoulder point scale on said front shoulder member.

2. A drafting device for a coat, overcoat and the like comprising a base rule having a size scale thereon and a construction line index, and means carried by the base rule providing an armhole curve adjustable for size including a back width member adjustably carried by the base rule said back width member having a portion of the back shoulder height armhole curve on one edge thereof, a size scale along the armhole curve on the back width member, a groove near the upper left edge of the back width member a blade armhole member adjustably and removably attached to the back width member and movable therewith and adjustable laterally of the base rule, the blade armhole member having a portion of the back shoulder height armhole curve facing the front armhole curve carried by the front shoulder member, a size scale and an arm with a tongue at the lower edge on the blade armhole member, said tongue sliding in the groove near the upper left edge of the back width member for controlling the movement of the blade armhole slide.

3. A drafting device for a coat, overcoat and the like as in claim 2 including a back shoulder height scale along the right part of the armhole curve of the back width member.

4. A drafting device for a coat, overcoat and the like as in claim 2 including an undersleeve width scale carried by the back width member and extending into the member obliquely along the lower edge of an obliquely cut slot from the armhole curve of the member.

5. A drafting device for a coat, overcoat and the like comprising a base rule having an edge providing a breast line reference, a construction line reference index on the base rule, at least one size scale on the base rule; and means carried by the base rule providing an armhole curve adjustable for size and location including a front shoulder member movably mounted upon the base rule and having a portion of a front armhole curve, a sleeve balance line on said member extending at right angles to the base rule, a forwardly inclined strap line edge on said member extending at an angle of approximately 23° with respect to the sleeve balance line and intersecting the breast line at the sleeve balance line when the member is positioned on the base rule for drafting normal coats, a neck point rider adjustably mounted upon the front shoulder section member for adjustment laterally and longitudinally thereon and having a strap line edge coincident with the strap line edge of the front shoulder member, said rider having along its strap line edge a neck point scale, a front shoulder lever pivoted to the neck point rider at the end of its strap line edge, and a front shoulder point scale carried by the front shoulder lever.

6. A drafting device for a coat, overcoat and the like as in claim 5 including a pair of rider guides slidably mounted on said rider for controlling the movement of the rider; a pair of neck point rider horizontal scales carried by the neck point rider for cooperating with the right edge of the pair of rider guides for locating the horizontal position of the neck point rider.

7. A drafting device for a coat, overcoat and the like comprising a base rule having an edge providing a breast line reference, a construction line reference index on the base rule, at least one size scale on the base rule; and means carried by the base rule providing an armhole curve adjustable for size and location including a front shoulder member movably mounted upon the base rule, a front armhole shape line lever pivotally secured to the front shoulder member and having an edge providing a portion of a front armhole curve, a sleeve balance line on said member extending at right angles to the base rule, a forwardly inclined strap line edge on said member extending at an angle of approximately 23° with respect to the sleeve balance line and intersecting the breast line at the sleeve balance line when the member is positioned on the base rule for drawing normal coats, a neck point rider adjustably mounted upon the front shoulder section member for adjustment laterally and longitudinally and having a strap line edge coincident with the strap line edge of the front shoulder member, said rider having along its strap line edge a neck point scale, a front shoulder run line lever pivoted to the neck point rider at the end of its strap line edge, a front shoulder point scale on the front shoulder lever, for cooperating with the front armhole lever.

8. A drafting device for a coat, overcoat and the like as in claim 7 including perforations along the indicia of the front shoulder point scale for conveniently marking points on the scale.

9. A drafting device for a coat, overcoat and the like comprising a base rule, a construction line reference index on the base rule, at least one size scale on the base rule; and means carried by the base rule providing an armhole curve adjustable for size including a front shoulder member movably mounted upon the base rule and having a portion of a front armhole curve integral with the member, a sleeve balance line on said member extending at right angles to the base rule, a forwardly inclined strap line edge on said member extending at an angle of approximately 23° with respect to the sleeve balance line for the full length of the member and intersecting the breast line at the sleeve balance line when the member is positioned on the base rule for drawing normal coats, a strap line inch scale and a neck point scale along the strap line edge, a front shoulder run line integral with the upper edge of the member, and a front shoulder point scale along the front armhole curve of said member.

10. A drafting device for a coat, overcoat and the like comprising a base rule, a construction line reference index on the base rule, at least one size scale on the base rule, means providing at least one portion of the contour above the breast line for a coat including at least one member carried upon the base rule and extending laterally therefrom and having a portion of a coat curve at an edge thereof, a size scale on each member along the curve, and a breast allowance member carried by the base rule at the other end thereof from the construction line reference index and having a single breast index and a double breast index, and a size scale on the base rule for the breast allowance member.

11. A drafting device for a coat, overcoat and the like comprising a base rule having a size scale thereon and a construction line index, means carried by the base rule providing an armhole curve adjustable for size including a front shoulder member and a breast member adjustably mounted upon the base rule and having a portion of a front armhole curve and a sleeve balance line on said front shoulder member extending at right angle to the base rule and a forwardly inclined strap line edge on said front shoulder member extending at an angle of approximately 23° with respect to the sleeve balance line and intersecting the breast line at the sleeve balance line when the member is positioned on the base rule for drawing normal coats, a strap line inch scale and a neck point scale along the strap line edge of said front shoulder member, a front shoulder point scale along the front armhole curve of said front shoulder member, and a back width scale on the base rule lower right edge, a back width member adjustably carried by the base rule and having an armhole curve on one edge thereof, a size scale on the back width member along the armhole curve, a blade armhole member adjustably and removably attached to the back width member and movable therewith and adjustable laterally of the base rule, the blade armhole member having a blade armhole curve facing the front armhole curve on said front shoulder member, said blade armhole member also having a blade armhole notch whose edges are the front and back side seam runs, and a size scale on the blade armhole member.

12. A drafting device for coats, overcoats and the like comprising a base rule having a size scale thereon, and a construction line index, means carried by the base rule providing an armhole curve adjustable for size including a front shoulder member adjustably mounted upon the base rule having a portion of a front armhole curve, a sleeve balance line index on said member extending at right angle to the base rule, and a forwardly inclined strap line edge on said member extending at an angle of approximately 23° with respect to the sleeve balance line and intersecting the breast line at the sleeve balance line index when the member is positioned on the base rule for drawing normal coats, a strap line scale along the strap line edge, a front shoulder point scale along the front armhole curve of said member; a back width member adjustably carried by the base rule and having an armhole curve on one edge thereof, a size scale on the back width member along the armhole curve, a blade armhole member adjustably attached to the back width member and movable therewith and adjustable laterally of the base rule, the blade armhole member having a blade armhole curve facing the front armhole curve on said front shoulder member, and a size scale on the blade armhole member; a scye depth member having an upper straight edge removably attached to the base rule and extending laterally therefrom and having a center seam run curve at an edge thereof, a size scale along the right part of the curve, and an inch scale along the upper straight edge.

13. A drafting device as in claim 12 including a breast member separately secured to the front shoulder member and extending over the base rule, and the back width member being adjustably mounted over the breast member.

14. A drafting device as in claim 13 including a midway line scale on part of the left edge of the breast member between the back width member and the front shoulder member.

15. A drafting device as in claim 13 including an underarm seam locating scale carried by the breast member and extending at an angle of about 82° with respect to the side of the breast member and located between the back width member and the front shoulder member.

16. A drafting device as in claim 13 including a sleeve width scale along the left edge of the breast member just below the midway scale and extending to the lower end of the member.

17. A drafting device as in claim 13 including an armhole scale located about midway along the right edge of the breast member.

18. A drafting device as in claim 13 including slot means in the base rule and the breast member extending lengthwise thereof, means carried by the front shoulder member engaging in the slot means, and means carried by the back width member engaging in the slot means in the base rule and the breast member.

19. A drafting device as in claim 18 in which the slot means is a pair of slots spaced apart a distance corresponding to a square shoulder adjustment, and tongue means carried by the breast member and the back width member and receivable in either of the pair of slots.

20. A drafting device as in claim 19 including a shoulder adjuster for the front shoulder member and the back width member and insertable between each member and the edge of the base rule.

21. A drafting device as in claim 11 including a front side seam run and a back side seam run carried by the blade armhole member extending towards the base rule and from the end of the blade armhole curve.

22. A drafting device as in claim 12 including a scye depth rule member having that part of its upper edge which rests upon the base rule, curved downward to meet the base rule for allowing the lower end of the breast member to ride freely over the scye depth rule member.

23. A drafting device as in claim 12 including a top back member slidably mounted on said scye depth rule and having a top back width scale, a scye depth scale along the curve of the scye depth member for cooperating with the top back width scale carried by the top back member along its lower curve edge, and including the shoulder back run line as the upper curved edge and the top back run line as the lower curved edge of the top back member, both run lines meeting at the back neck point of the top back member.

24. A drafting device as in claim 12 including a top back member, means mounting the top back member adjacent the end of the scye depth member and adjustable towards and from the base rule and adjustable parallel to the base rule, run line curves carried by an edge of the top back member, and a size scale on the top back member.

25. A drafting device as in claim 23, said scye depth member having a horizontal space groove between a top and bottom wall for the full width of the member and a pair of vertical space grooves running longitudinally through the right part of the scye depth member, said grooves terminating at the closed right end of the scye depth member, said top back slide member slidably movable in said horizontal space groove between the top and bottom wall of said scye depth member, said top back member having a top back width proportion scale along its lower right curved edge, a leg at its upper end, and a longitudinal groove partly through its center and at right angle to the horizontal and vertical space grooves of the said scye depth member.

26. A drafting device as in claim 25 including an eccentric double cross member slidably movable in the grooves of the scye depth and top back slide members, for limiting the relative motion of the top back slide member to a rectilinear movement at right angle to the scye depth member, said eccentric double cross member having a middle section fastened near one end at right angle to and between two outer parallel sections, said outer parallel sections being fastened equally near one of their ends to the said middle section which slides in the groove of the top back slide member and in the horizontal groove of the scye depth manner, while the two outer sections slide in the vertical grooves of the said scye depth member.

27. A drafting device as in claim 7, said front shoulder member having some of its upper right end cut away, a front shoulder run line curve along the right outer edge of the front shoulder run line lever, the lower end of said front shoulder run line lever expanded to the left of the front shoulder run line edge into a frustumlike shaped portion and said frustumlike shaped portion having a front shoulder point scale with index lines running lengthwise of the frustumlike shaped portion and at right angle to the indicia lines of the front shoulder point scale, said indicia lines being concentric arcs of the front shoulder run line curve edge and being indicated alternately by solid and dash broken lines, said index lines at right angle to the indicia of the front shoulder point scale having inscriptions designating alignment of the front shoulder run line shape lever for ranges of sizes of subnormal and abnormal breast line back width measurements and for normal and square shoulder measurements, said index lines at right angle to the indicia of the front shoulder point scale used for matching with the front armhole curve edge for positioning the front shoulder run line shape lever, said front shoulder run line shape lever having perforations at the intersections of the index lines and the indicia lines of the front shoulder point scale, said lower frustumlike portion of the front shoulder run line shape lever allowing the front armhole shape line lever to pass under it for matching with the index and indicia lines, the left edge of the expanded portion of the front shoulder run line lever being an index edge for matching with the index lines of the front armhole run line shape lever, said front armhole shape line lever having at its pivot end an index edge for matching with the indicia of the said radial index, a free end inscribed with index lines being arcs of the front shoulder run line curve and designating the alignment of the front shoulder run line shape lever for ranges of sizes of subnormal and abnormal breast line back width measurements and for normal and square shoulder measurements, said index lines of the front armhole shape lever when matched or made coincident with the left index edge of the expanded portion of the front shoulder run line shape lever cooperate in positioning the front shoulder run line shape lever.

28. A drafting device for a coat, overcoat and the like as in claim 7, said front shoulder member having a pair of normal neck point rider guides slidably mounted on the front shoulder member and on the normal neck point rider for controlling the vertical movement of the normal neck point rider, said front shoulder member having at the right side a pair of normal neck point rider vertical scales cooperating with the lower edge of the pair of normal neck point rider guides for establishing the vertical position of the normal neck point rider.

29. A drafting device as in claim 13 including an elongated waist rule and a waist front width slide member slidably mounted on said waist rule for dimensioning along the waist line the prolonged lines from the breast base rule, the front shoulder member, the breast, the back width, the blade armhole slide, and the scye depth rule members for laying out points along the waist line, said waist rule having near its lower extremity a construction line index, an extension from said construction line index to serve as a handle, a normal center seam run line index above the construction line index, said normal center seam run line index being the zero line of the waist center seam run line plus and minus scale marked along the right and left edge of the waist rule and above and below the normal center seam run line index, said waist rule having also a waist back width sacle along its right edge, a pair of longitudinal slots in its upper half for receiving the waist front width slide, and a pair of lugs on the face of the waist rule at the upper extremity of said slots for guiding the waist front width slide, said waist front width slide having near its lower end a sleeve balance line index for matching with the prolonged sleeve balance line for single breast designing, a double breast line index along its lower edge for cooperating with the prolonged sleeve balance line when designing double breast garments, a pair of tongues on the underside of the waist front width slide at the lower extremity of a pair of longitudinal slots for engaging the slots of the waist rule, said longitudinal slots of the waist front width slide extending from said tongues to near the upper end of said slide for engaging the lugs of the waist rule, a waist front width scale extending from the upper end to near the middle along the right edge of the waist front width slide for locating the waist front balance point, and a leg on the underside of the upper end of said waist front width slide.

30. A drafting device as in claim 1 including a top sleeve shape run line for ¾ sleeve on the front shoulder member indicated by a curve with perforations extending from the top sleeve front notch to the left and upwards terminating at the top sleeve line marked across the front shoulder member for laying out the top sleeve line when drafting a sleeve.

31. A drafting device as in claim 1 including a back width member comprised of one element adjustably and removably carried by the base rule and having a portion of the back height shape curve along its upper edge, a back sleeve notch scale and a back shoulder height scale along the back height shape curve, said back sleeve notch scale located left of said back shoulder height scale, a sleeve width line index along its lower left edge, said lower left edge prolonged to the right of the member for its full length as the sleeve width line, a lower right edge extending below the lower left edge, a longitudinal slot cut along the edge of the sleeve width line between the sleeve width line and the lower right edge for tracing the sleeve width line on the draft, a top sleeve height scale along the sleeve width line opposite said slot, and an undersleeve height scale along the lower edge of said slot and to the left of the top sleeve height scale.

32. A drafting device for a coat, overcoat and the like comprising a base rule having a size scale thereon and a construction line index, and means carried by the base rule providing an armhole curve adjustable for size and location including a front shoulder member and a breast member having an undersleeve and top sleeve line on said breast member and adjustable upon the base rule, said front shoulder member having a portion of a front armhole curve, a sleeve balance line across the breast member coincident with the sleeve balance line on the front shoulded member extending at right angle to the base rule and a forwardly inclined strap line edge on said front shoulder member extending at an angle of approximately 23° with respect to the sleeve balance line and intersecting the breast-line at the sleeve balance line when the front shoulder member is positioned on the base rule for drawing normal coats, a strap line inch scale and a neck point scale along the strap line edge of said front shoulder member, and a front shoulder point scale along the front armhole curve of said front shoulder member, a back width size scale on the basic rule lower right edge, a back width member adjustably mounted upon the base rule and having an armhole curve on one edge thereof, and two size scales on the back width member along its curve, said breast member having a sleeve width scale along its lower left edge and an armhole sacle along the middle of its right edge, said back width member having a straight upper edge left of its upper curved edge and a lower left edge above its lower right edge, said upper left edge being an index edge for matching with the indicia of the sleeve width and armhole scales of the breast member, said lower left edge being an index edge for matching with the indicia of the back width scale of the base rule for locating the position of the back width member on the draft.

33. A drafting device as in claim 29 including a seat rule, a seat front width slide and a tapered skirt slide, said seat front width slide slidably mounted on the upper third of the seat rule and said tapered skirt slide slidably mounted on the middle third of the seat rule for dimensioning along the seat line points and prolongated lines from the members along the breast and waist lines, said seat rule having near its lower end a construction line index, an extension from said construction line index to serve as a handle, a normal center seam run line index, said normal center seam run line index being the zero line of the seat center seam run line plus and minus scale marked along the right and left edge of the seat rule above and below the normal center seam run line index, said seat rule having two pairs of longitudinal slots, one pair being longer than the other, said shorter pair extending through the middle third of the seat rule for receiving the tongues of the skirt slide, said longer pair extending through the upper third of the seat rule for receiving the tongues of the seat front width slide, a pair of lugs on the face of the seat rule at the upper extremity of the longer pair of slots for engaging the slots of the seat front width slide, a seat back width scale extending through the middle of the seat rule and along its right edge, said tapered skirt slide having an upper edge serving as an index edge for matching with the indicia of the seat width scale on the seat rule and also as the seat back side seam run line index, a lower edge serving as the seat front side seam run line index, tracings being made along the said run line indices, a left edge longer than the right edge, a pair of tongues on the underside of the skirt slide for engaging said shorter pair of slots of the seat rule, and a leg on the underside at the left extremity of the skirt slide, said seat front width slide having near its lower end a sleeve balance line index for matching with the prolonged sleeve balance line when designing single breast coats, a double breast line index along its lower edge for matching with the prolonged sleeve balance line when drafting a double breast garment, a pair of tongues on the underside of the seat front width slide at the lower extremity of a pair of longitudinal slots for engaging the slots in the upper third of the seat rule, said pair of slots of the seat front width slide extending from the tongues to near the upper end of the seat front width slide, for engaging the lugs of the seat rule, a seat front width scale extending from the upper end to near the middle along the right edge of the seat front width slide for locating the seat front balance point, and a leg on the underside of the upper end of said seat front width slide.

References Cited in the file of this patent

UNITED STATES PATENTS

| | | |
|---|---|---|
| 98,618 | Ordway | Jan. 4, 1870 |
| 327,172 | Jackson | Sept. 29, 1885 |

FOREIGN PATENTS

| | | |
|---|---|---|
| 2,621 of 1880 | Great Britain | June 26, 1880 |
| 13,711 of 1897 | Great Britain | June 3, 1897 |
| 17,245 | Switzerland | Aug. 4, 1898 |
| 13,109 of 1889 | Great Britain | Aug. 20, 1889 |
| 453,874 | Italy | Dec. 19, 1949 |
| 449,602 | Italy | Dec. 25, 1949 |

UNITED STATES PATENT OFFICE
CERTIFICATE OF CORRECTION

Patent No. 2,814,878      Aage T. Kolthoff et al.      December 3, 1957

It is hereby certified that error appears in the printed specification of the above numbered patent requiring correction and that the said Letters Patent should read as corrected below.

Figures 2, 3:
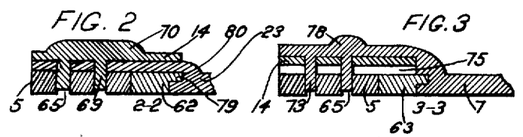
Figures 2, 3, 4, 5 are transverse elevation cross-sectional views of the drafting device taken through the planes indicated respectively by the lines 2—2, 3—3, 4—4, 5—5 of Figure 1.
Figure 4:
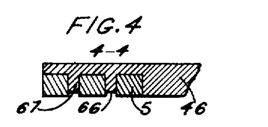

Column 1, line 50, after "neck" insert -- point --; column 2, line 11, for "similar" read -- simpler --; column 3, line 22, for "Figs. 1 and 3" read -- Figs. 1 and 23 --; line 34, for "wormed" read -- formed --; column 5, line 25, for "tongues" read -- tongue --; column 7, line 49, for "at" read -- as --; column 8, line 52, strike out the italicized "a"; line 59, after "it" insert -- was --; line 65, after "line" insert -- 16 --; line 68, for "setam" read -- seam --; column 9, line 6, after "balance" insert -- point --; line 17, for "145'" read -- 145 --; column 10, line 74, for "locating" read -- location --; column 13, line 37, for "separately" read -- separably --; column 14, line 48, for "manner" read -- member --; column 16, line 39, for "sacle" read -- scale --.

Signed and sealed this 24th day of June 1958.

(SEAL
Attest
KARL H. AXLINE
Attesting Officer

ROBERT C. WATSON
Commissioner of Patents